3,471,388
ELECTRODEPOSITION OF AQUEOUS COATINGS CONTAINING ETHERIFIED METHYLOLATED MELAMINE
Jerry Norman Koral, Stamford, Conn., assignor to American Cyanamid Company, Stamford, Conn., a corporation of Maine
No Drawing. Filed Feb. 7, 1966, Ser. No. 525,342
Int. Cl. C23b 13/00; B01k 5/02
U.S. Cl. 204—181                                    11 Claims

ABSTRACT OF THE DISCLOSURE

A composition of matter comprising an aqueous dispersion of a mixture of from about 5% to about 40%, by weight, of (A) a mixture of substantially water-insoluble, substantially fully etherified hexamethylol melamines which have no more than four methoxymethyl groups on the average and at least two alkoxymethyl groups selected from the group consisting of ethoxymethyl, propoxymethyl and butoxymethyl on the average and correspondingly from about 95% to about 60%, by weight, of (B) a water dispersible nongelled polymeric material carrying an ionic charge which polymeric material contains at least one class of reactive groups selected from the group consisting of carboxyl groups, alcoholic hydroxy groups and amide groups wherein the amount of said groups are at least about 3%, by weight, and not more than about 30%, by weight, based on the total weight of said polymeric material wherein said groups are heat reactive with (A) wherein said percentages of (A) and (B), by weight, total 100% and are based on the total solids weight of (A) and (B).

---

This invention relates to a composition of matter comprising an aqueous dispersion of a mixture of certain substantially water-insoluble, substantially fully etherified hexamethylol melamines and an ionic water dispersible nongelled polymeric material which is heat reactive with said melamines. Still further, this invention relates to a composition of matter comprising an alkaline aqueous dispersion of a mixture of from about 5% to about 40%, by weight, of (A) a mixture of substantially water-insoluble, substantially fully etherified hexamethylol melamines which have no more than four methoxymethyl groups on the average and at least two alkoxymethyl groups selected from the group consisting of ethoxymethyl, propoxymethyl and butoxymethyl, on the average, and correspondingly from about 95% to about 60%, by weight, of (B) a water dispersible nongelled polymeric material carrying an ionic charge which is heat reactive with (A) wherein said percentages, by weight, total 100% and are based on the total solids weight of (A) and (B).

One of the objects of the present invention is to produce a composition of matter comprising an aqueous dispersion of a mixture of a plurality of substantially water-insoluble, substantially fully etherified hexamethylol melamines and a water dispersible nongelled polymeric material carrying an ionic charge, namely, either cationic or anionic charges, which is heat reactive with said etherified hexamethylol melamines. A further object of the present invention is to produce an aqueous dispersion of an organic coating composition which can be applied to electroconductive metals by use of an electrodeposition or an electrocoating technique. These and other objects of the present invention will be discussed in greater detail hereinbelow.

For a number of years, the methods used in painting metallic articles having irregularly shaped surfaces included hand or automatic spray painting, electrostatic painting, brushing, of dipping. Electrophoretic techniques have been applied in coating articles having a relatively small surface area, but these techniques have been restricted to the application of special coating materials. The present methods of applying a surface coating on large metallic articles have resulted in the waste of relatively large amounts of the coating due to overspraying or due to the accumulation of excess paint material along certain surfaces of the coated articles. Additionally, these coating techniques usually result in a relatively poor surface finish to the article being coated due to uneven distribution of paint or due to surface blemishes. A further shortcoming of the prior methods for applying a coating onto comparatively large metal articles resides in the fact that it has been rather difficult to obtain a relatively uniform film of paint over the entire surface of the electroconductive metal article. A further shortcoming resides in the fact that certain of the surfaces were not readily accessible to the application of the coating material which results in an unsatisfactory coating. Recessed areas such as the rocker panels of automobiles have only been coated by the prior art techniques at considerable expense because of the requirements of special coating techniques or special hand labor operations in order to obtain at least a minimum measure of protective coating against corrosion. The technique of dipping the metallic article in a paint bath to obtain a coating on recessed surfaces of a metallic article has not proven satisfactory since the evaporation of solvents from the paint film has resulted in washing off a portion of the adhered paint coating. It is, therefore, one of the principal objects of the present invention to provide a composition of matter which can be used effectively in the coating of electroconductive metallic articles by use of an electrophoretic technique which will provide a substantially uniform coating on all surfaces being treated.

Reference is made to the article entitled "Electrodeposition: Theory and Practice," by Glover et al, in the Official Digest, February 1965, pages 113–128, inclusive. Attention is also directed to the British Patent 933,175, which was published on Aug. 8, 1963, entitled "Improvements in a Electrophoretic Coating Process." Each of these references is incorporated herein by reference.

In the composition of the present invention, there is blended a mixture of certain substantially water-insoluble, substantially fully etherified hexamethylol melamines and a water dispersible non-gelled polymeric material carrying an ionic charge which is heat reactive with said melamine compounds. These two principle components are blended in an aqueous solvent. The dispersion medium may consist of water alone or may contain additional solvents but, generally, water should be the preponderant member of the dispersion medium and, for economic reasons, the other possible solvents that could be used with water are omitted unless they are designed to serve some special function.

The component (A) is a mixture of substantially water-insoluble, substantially fully etherified hexamethylol melamines which have no more than four methoxymethyl groups, on the average, and at least two alkoxymethyl groups selected from the group consisting of ethoxymethyl, propoxymethyl and butoxymethyl, on the average. It is preferred that there be no more than three methoxymethyl groups, on the average, and at least three alkoxymethyl groups selected from the group consisting of ethoxymethyl, propoxymethyl and butoxymethyl, on the average. The preferred species would be one in which there are no more than three methoxymethyl groups, on the average, and at least three ethoxymethyl groups, on the average.

These etherified methylol melamines are not considered to be resinous materials since they are, as individual entities, pure compounds, but they are potential resin-forming compounds which enter into chemical reaction with certain ionic water dispersible nongelled polymeric materials when subjected to heat and particularly when subjected to heat under acidic conditions. The concept of the degree of methylation or, more broadly, alkylation on the average, will be discussed herein order that this concept may be fully understood.

Theoretically, it is possible to methylolate melamine fully, that is, to produce hexamethylol melamine. However, frequently a composition purporting to be hexamethylol melamine, when analyzed shows a fractional degree of methylolation. It is well recognized that fractional methylolation is not considered to be possible. As a consequence, when a composition containing on analysis a degree of methylolation of 5.75, 5.80 or even 5.90, it has to be recognized that this is but an average degree of the methylolation of the melamine compound and establishes logically that the aforementioned methylol composition is composed of a mixture of a preponderant amount of hexamethylol melamine with comparatively minor amounts of pentamethylol melamine and perhaps insignificant amounts including traces of such derivatives as tetramethylol melamine and even trimethylol melamine. The same concept of average is also applicable to the alkylation or etherification of the hexamethylol melamine composition. There cannot be, based on present reasoning, a fractional alkylation and, as a consequence, when on analysis, a given composition shows that the degree of methylation is 2.5 and the degree of ethylation is correspondingly about 3.5, it must be concluded that there is present in such a composition some dimethyl ether tetraethyl ether of hexamethylol melamine as well as some trimethyl ether, triethyl ether of hexamethylol melamine. There may be present additionally some monoethyl ether, pentamethyl ether of hexamethylol melamine, or even some tetramethyl ether diethyl ether of hexamethylol melamine. As a consequence, the mixture of substantially water-insoluble, substantially fully etherified hexamethylol melamines which have no more than four methoxymethyl groups, on the average, and at least two alkoxymethyl groups selected from the group consisting of ethoxymethyl, propoxymethyl and butoxymethyl, on the average, may contain any one of the following compounds and in varying amounts depending on the degree of methylation and the degree of different alkylation. Included in that group of compounds are the following: pentamethyl monoethyl ethers of hexamethylol melamine, tetramethyl, diethyl ethers of hexamethylol melamine, trimethyl triethyl ethers of hexamethylol melamine, dimethyl tetraethyl ethers of hexamethylol melamine, monomethyl, pentaethyl ethers of hexamethylol melamine and the hexaethyl ethers of hexamethylol melamine. When propanols, including normal propanol as well as isopropanol, are used as the alkylating material, the following ethers may be present in the system or mixture: pentamethyl monopropyl ethers of hexamethylol melamine, tetramethyl, dipropyl ethers of hexamethylol melamine, trimethyl tripropyl ethers of hexamethylol melamine, dimethyl tetrapropyl ethers of hexamethylol melamine, monomethyl, pentapropyl ethers of hexamethylol melamine, and hexapropyl ethers of hexamethylol melamine. When the butanols are used, including normal butanol, isobutanol and tertiary butanol, as the alkylating material, the blend of etherified hexamethylol melamines may include some or all of the following derivatives depending on the degree of methylation and the degree of butylation: pentamethyl monobutyl ethers of hexamethylol melamine, tetramethyl, dibutyl ethers of hexamethylol melamine, trimethyl tributyl ethers of hexamethylol melamine, dimethyl tetrabutyl ethers of hexamethylol melamine, monomethyl, pentabutyl ethers of hexamethylol melamine and the hexabutyl ethers of hexamethylol melamine. In addition to dihetero alkylation of the hexamethylol melamine, one could prepare and utilize trihetero alkylated hexamethylol melamines and tetrahetero alkylated hexamethylol melamines, if desired, but the process for preparing such a trihetero alkylated or a tetrahetero alkylated material would present processing complications, and it has not been found that any advantage is to be gained by using such trihetero alkylated and tetrahetero alkylated materials. As a consequence, the commercialization of these etherified hexamethylol melamines is expected to be limited to the dihetero alkylated hexamethylol melamines.

The amount of the mixture of substantially water-insoluble, substantially fully etherified hexamethylol melamines used in the composition of the present invention will vary betwen about 5% and about 40%, by weight, based on the total weight of said etherified hexamethylol melamines and the ionic water dispersible nongelled polymeric material which is heat reactive with said melamine compounds mixture. Correspondingly, in the composition there will be from about 95% to about 60%, by weight, of the ionic water dispersible nongelled polymeric material which is heat reactive with said etherfied hexamethylol melamines based on the total weight of said ionic polymeric material and said mixture of the etherified hexamethylol melamines. It should be apparent that all of the above percentages, by weight, will total 100%, by weight, and are based on the total solids weight of the melamine compounds and said ionic polymeric material. It is preferred to use between about 15% and about 25%, by weight, of the melamine compounds and coresponding from about 85% and 75%, by weight, of the said ionic polymeric material, same basis.

The process for making a representative mixture of substantially water-insoluble, substantially fully etherified hexamethylol melamines is set forth hereinbelow. This example is set forth primarily for the purpose of illustration and no specific enumeration of detail contained therein should be interpreted as a limitation on the claims except as is indicated in the appended claims. All parts are parts, by weight, unless otherwise indicated.

PREPARATION OF A MIXTURE OF FULLY MIXED ETHERS OF HEXAMETHYLOL MELAMINE

Into a suitable reaction vesel equipped with a thermometer, stirrer and condenser, there is introduced 540 parts of methanol and 2.5 parts of a 50% aqueous solution of sodium hydroxide. The temperature is raised to 38° C. and 542 parts of paraformaldehyde are added over a 30 minute period. The temperature is then raised to 47–52° C. and held there for 30 minutes. Thereupon, 216 parts of melamine are added over a 10 minute period. The reaction mixture is heated to reflux (i.e., 79–82° C.) and held at that temperature for 15 minutes. Thereupon, 339 parts of methanol is added and the reaction mixture cooled to 29° C. and 34 parts of nitric acid are added. The reaction mixture is held at the pH of 1.6 for about 45 minutes and then neutralized with 29 parts of a 50% aqueous solution of sodium hydroxide and 2.8 parts of sodium carboxide. The reaction mixture is concentrated to 100% solids by vacuum distillation at 104° C./50 mg. of pressure, absolute. This material is identified as Part 1 for purposes of simplicity. 648 parts of Part 1 and 857 parts of ethanol are introduced into a suitable reaction vessel equipped with a stirrer, thermometer and condenser. To this reaction mixture there is added 18.5 parts of nitric acid and the reaction mixture is held between 30 and 36° C. for 30 minutes. The reaction mixture is neutralized with 16.5 parts of a 50% aqueous solution of sodium hydroxide. The product is then concentrated to substantially 100% solids by vacuum distillation at 104° C. and 50 mg. of pressure, absolute. The product had an analysis of the following molar ratio: melamine/formaldehyde/methanol/ethanol equal to 1/5.9/2.4/3.2, respectively.

The second component in the compositions of the present invention is a water dispersible non-gelled polymeric material carrying an ionic charge or more precisely either an anionic or cationic charge. These two classes of ionically charged materials will be discussed hereinbelow.

It is deemed advisable to engage in a discussion of these ionic water dispersible nongelled polymeric materials. It should be observed that it is not sufficient for the ionic water dispersible nongelled polymeric material to be either cationic or anionic. This nongelled polymeric material must in addition to the aforementioned charge characteristic, also contain one or more reactive sites selected from the group consisting of carboxyl groups, alcoholic hydroxyl groups or amido groups in order to cross-link with the melamine compounds used in the present invention. If the nongelled polymeric material contains carboxyl groups, it will be anionic but it will be capable of being converted to a cationic material by amination or by use of a cationic surfactant, which material will inherently be carrying with it the cross-linking sites for the melamine compound. On the other hand, if the nongelled polymeric material is devoid of any carboxyl groups, but does contain alcoholic hydroxyl groups and/or amido groups, said polymeric material will be nonionic but can be converted to an anionic material by carboxylating the polymeric material or by dispersing said polymeric material in water with an anionic surfactant. By the same token, if a nongelled water dispersible polymeric material devoid of any carboxyl groups but containing alcoholic hydroxyl groups and/or amido groups were to be prepared, such material again, as before, would contain the necessary cross-linking sites but would, nevertheless, be a nonionic polymeric material. In order to convert such a nonionic polymeric material to a cationic polymeric material, the polymeric material must be aminated with either a primary, secondary or tertiary amine compound or it must be dispersed in water with a cationic surfactant. The purpose for having the electric charge on the water dispersible nongelled polymeric material is so that it will migrate to the anode in an electric phoretic system if an anionic material is present and will migrate toward the cathode if a cationic polymeric material is present. It will be apparent from the illustrative examples of the present invention that these charged polymeric materials move to their respective poles along with the melamine compounds and become deposited thereon. After the deposition of the mixed polymeric material has been accomplished on the electroconductive metal, the coated metal is then heat treated, preferably by baking, in order to accomplish the cross-linking between the melamine compounds and the polymeric material containing the cross-linking sites that are heat reactive with the melamine compounds. As used in an electrodeposition process, the bath of the aqueous compositions of the present invention should have a pH varying between about 1 and 11 and, preferably, between about 4 and 9. For the anionic compositions, the pH is controlled between about 4 and 11 and, preferably, between about 7 and 9 whereas the cationic material has a pH between about 1 to 8 and, preferably, about 4 to 7. Hereinbelow, there is set forth a further discussion of these two classes of polymeric materials, namely, the anionic water dispersible nongelled polymeric materials which are heat reactive with the melamine compounds and the cationic water dispersible nongelled polymeric materials that are heat reactive with the melamine compounds.

The anionic water dispersible nongelled polymeric material used in the composition of the present invention may be any one of a plurality of polymeric materials which have reactive sites that are heat reactive with the etherified melamine compounds. These reactive sites may be carboxyl groups and/or alcoholic hydroxyl groups and/or amido groups, which polymeric materials are the result of vinyl polymerization, epoxy polymerization, polyester compositions, or maleinised oils. These polymeric materials may be completely water soluble or they may be substantially water insoluble but which are capable of being dispersed in water. Sometimes it may be necessary to use appropriate surfactants to disperse these polymeric materials. The term "water dispersible," therefore, is intended to encompass both the aqueous solutions as well as dispersions in which the polymeric material is suspended in the aqueous medium. These anionic polymeric materials may contain, as the sole reactive sites, carboxyl groups or alcoholic hydroxyl groups or amide groups, or they may, in fact, contain all three.

When the polyester resins are used, they are prepared by reacting a polycarboxylic acid including dicarboxylic acids with a polyhydric alcohol, including the glycols. The polycarboxylic acids may be either saturated, i.e., free of nonbenzenoid unsaturation, or they may be $\alpha,\beta$-ethylenically unsaturated.

If the polyester resins as used contain preponderant amounts of the polycarboxylic acid, such polyester should be reacted until an acid number of not less than about 35–40 is reached and, preferably, to an acid number of between about 50–150. If the polyester resin is prepared by using a preponderance of alcholic hydroxyl groups, the ingredients forming the polyester are permitted to react until a hydroxyl number of not less than about 35–40 is reached and, preferably, between about 50 and 150.

When these anionic polymeric materials are prepared and dispersed in water, they may be rendered alkaline by adjusting the pH to a point above 4 to about 11 and, preferably, to a pH above about 7.1 to about 9. This adjustment of the pH is accomplished on the anionic polymeric material before the etherified hexamethylol melamine compounds are added and then, if necessary, the pH is readjusted to a point within the ranges set forth hereinabove.

The maleinised oils are water soluble or water dispersible and are prepared by reacting unsaturated glyceride oils with an acid or anhydride dienophile such as maleic anhydride. Other acids or anhydride dienophile have also been used and these include acrylic acid, crotonic acid, and the like. These water solubilized oils were discussed by J. J. Hopwood at the Sixth Australian Convention, Warburton, 16–19, July 1964, and a paper has been published entitled "Water Soluble Thermosetting Organic Polymers" in the Journal of the Oil and Colour Chemists Association, February 1965, pages 157–171, inclusive, which reference is incorporated herein by reference.

All of these anionic water dispersible non-gelled polymeric materials having carboxyl groups and/or alcoholic hydroxyl groups and/or amide groups have water sensitive sites obviously, by virtue of the presence of these groups, and these water sensitive sites should all be tied up by interreaction with the etherified hexamethylol melamine compounds in a cross-linking mechanism. Before the cross-linking takes place, the melamine compounds also function as plasticizers for the total composition.

The anionic polymeric materials prepared by vinyl-polymerization may be prepared in either an aqueous solution, an organic solvent, or in an aqueous emulsion system, all of which procedures are thoroughly well known in the art, and it is not deemed necessary to elaborate on such procedures here.

The vinyl polymers may be prepared by polymerizing polymerizable monomers such as acrylic acid, methacrylic acid, crotonic acid, cinnamic acid, $\beta$-benzoyl acrylic acid, and polycarboxylic acids of the $\alpha,\beta$-ethylenically unsaturated class such as maleic, fumaric, itaconic, mesaconic, ataconic, and the halogenated acids such as halogenated maleic or, more specifically, chloromaleic acid, and the like. These acidic materials may be copolymerized or polymerized with other monomers which contain no carboxyl groups such as methyl acrylate, ethyl acrylate, propyl acrylate, butyl acrylate, octyl acrylate, decyl acrylate, lauryl acrylate, methal methacrylate, ethyl methacrylate, butyl methacrylate, heptyl methacrylate, decyl methacrylate, propyl crotonate, butyl crotonate, nonyl crotonate, and the like. Still further, one could use such polymerizable compounds as styrene, ortho-, meta- or para-alkyl styrenes such as the o-, m- or p-methyl, ethyl, propyl and butyl styrenes, 2,4-dimethyl styrene, 2,3-dimethyl styrene, 2,5-dimethyl styrene, vinyl naphthenate, acrylonitrile, methacrylonitrile, halo ring or side chain styrenes such as α-cholo styrene, ortho-, meta- or para-chlorostyrenes, 2,4-dichlorostyrene, 2,3-dichlorostyrene, 2,5-dichlorostyrene or the alkyl side chain styrenes such as α-methyl styrene, α-ethyl styrene, and the like. Additionally, one can make use of such polymerizable vinyl monomers as acrylamide, methacrylamide, ethacrylamide, ethylenebisacrylamide, N-tertiary-butylacrylamide, and the like.

The anionic polymeric materials containing alcoholic hydroxyl groups are prepared by using a polymerizable vinyl monomer which contains an alcoholic hydroxyl and is to be found in such compounds as the hydroxyalkyl esters of α,β-unsaturated monocarboxylic acids such as the hydroxy alkyl esters of acrylic acid, methacrylic, ethocrylic and chloro as well as the other chloro substituted acrylic acids. These esters may either have a primary or a secondary hydroxyl group. Illustrative of the types of compounds that are used to make the copolymers in the anionic, polymeric material are 2-hydroxyethyl acrylate, 2-hydroxypropyl acrylate, 3-hydroxypropyl acrylate, 2-hydroxybutyl acrylate, 3-hydroxybutyl acrylate, 4-hydroxybutyl acrylate, 8-hydroxyoctyl acrylate, 2-hydroxyethyl methacrylate, 5-hydroxyhexylmethacrylate, 6-hydroxyoctylmethacrylate, 8-hydroxy-octylmethacrylate, 10-hydroxydecylmethacrylate, 3-hydroxypropyl crotonate, 4-hydroxyamyl crotonate, 5-hydroxyamyl crotonate, 6-hydroxyhexyl crotonate, 7-hydroxyheptyl crotonate, 10-hydroxydecyl crotonate, and the like. These hydroxy esters may be used either singly or in combination with one another with other polymerizable vinyl monomers devoid of any alcoholic hydroxyl group including those set forth hereinabove in the discussion of the carboxyl group-containing monomers. Additionally, one can make use of other hydroxyl-containing polymerizable vinyl monomers such as methylolacrylamide, methylolmethacrylamide, and the like.

Among the amide group-containing monomers which may be used in the preparation of the anionic, water dispersible, polymeric material used in the present invention are acrylamide, methacrylamide, ethacrylamide, and the like. These polymerizable acrylamides may be used to prepare anionic polymeric materials used in the present invention with any of the carboxyl group-containing monomers or the hydroxyl group-containing monomers or with any of the polymerizable monomers set forth hereinabove.

Additionally, one can make use of polyester resin compositions which are water dispersible nongelled anionic polymeric materials. Water soluble alkyd resins or water dispersible alkyd resins, whether oil free or glyceride oil-containing may be used and a plurality of these materials are commercially available and are also well known in the art and, as a consequence, it is not deemed necessary to make any prolonged recitation of such materials since they are fundamentally prepared by reacting a polyhydric alcohol with a polycarboxylic acid or with anhydrides such as phthalic anhydride, maleic anhydride, and the like.

Additionally, one can make use of epoxy esters as the anionic polymeric material in which the epoxy resins, which contain a plurality of hydroxyl groups, are reacted with glyceride oil fatty acids and then further reacted with maleic anhydride to yield a dispersion in an alkaline medium. Still further, one can make use of polyamides which are prepared by reacting alkylene polyamines with excess dicarboxylic acids to produce water soluble and water dispersible anionic polymeric materials.

A variety of emulsion anionic polymers may be used in the composition of the present invention, wherein the utilization of a variety of anionic surfactants or emulsifiers such as soaps and alkyl sulfonates are used to impart a charge characteristic to the emulsion particles which will result in the migration of such particles in electric fields. These same surfactants and in combination with a variety of nonionic surfactants can be used to post-emulsify a variety of epoxy esters, saturated and unsaturated alkyd resins and acrylic resins to prepare charged emulsion particles.

In order to illustrate the preparation of an anionic carboxyl group-containing polymer, the following example is set forth in which all parts are parts, by weight, unless otherwise indicated

CARBOXYL GROUP-CONTAINING POLYMER

Into a suitable reaction vessel equipped with stirrer, thermometer and reflux condenser, there is introduced 100 parts of dioxane. The charge is heated gradually to the reflux temperature by heating on an oil bath. After the dioxane has reached reflux, a mixture of 750 parts of butyl acrylate, 150 parts of acrylic acid and 100 parts of a 1% solution of butyl mercaptan in butyl acrylate are introduced in relatively small increments over a 2 hour period. Concurrently but separately, over the same period of time, there is added 12.2 parts of cumene hydroperoxide. After the addition is completed, reflux is continued for about 5 hours. 200 parts of the copolymer thus prepared are dissolved in 220 parts of a mixture of 1 part of concentrated ammonia (29% $NH_3$) to 4 parts of water. An additional 80 parts of water is added to give an aqueous solution of 36% solids concentration of the copolymer. The solvent dioxane is used in the present example in an amount approximately 10% of the total charge. At the end of the polymerization reaction, this solvent may be stripped off under vacuum but it is preferred to leave said solvent in since its removal is not economically justifiable and since this solvent is completely water miscible.

AN ALCOHOLIC HYDROXYL GROUP-CONTAINING EMULSION ANIONIC POLYMER

Into a suitable reaction vessel equipped with a thermometer, stirrer, condenser, and two additional funnels, there is added 440 parts of deionized water, 3.4 parts of sodium bicarbonate, and 2.0 parts of sodium lauryl sulfate. The mixture is heated to about 90° C. whereupon a catalyst solution containing 2.25 parts of ammonium persulfate dissolved in 110 parts of deionized water is prepared and 12 parts of this solution are added to the reaction vessel. This is followed by the addition of 90 parts of said catalyst solution uniformly over a two hour period in comparatively small increments to the reaction vessel. Concurrently, but separately, a monomer mixture of 170 parts of styrene, 235.6 parts of ethyl acrylate, 4.5 parts of acrylic acid and 32 parts of hydroxyethyl methacrylate is added uniformly over the same two hour period through a separate funnel. The remainder of the catalyst solution is then added to the reaction vessel and the mixture is heated at 90° C. for an additional one hour period. The reaction mixture thus prepared was analyzed and was shown to have a polymer solids of 48%.

AMIDE-CONTAINING EMULSION ANIONIC POLYMER

Into a suitable reaction vessel equipped with a thermometer, stirrer, condenser, and two addition funnels, there is introduced 348 parts of deionized water, 1.85 parts of sodium lauryl sulfate, and 4.08 parts of sodium bicarbonate. The reaction mixture is heated to 90° C. whereupon a catalyst solution containing 2.7 parts of ammonium persulfate in 115 parts of deionized water is prepared and 12 parts of this catalyst solution is introduced into the reaction vessel. Thereupon, 90 parts of said catalyst solution is added uniformly in comparatively small increments over a 2 hour period to the reaction vessel. Concurrently during said 2 hour period, but separately, there is added a monomer mixture of 212 parts of styrene, 293 parts of ethyl acrylate, 5.3 parts of acrylic acid, 21 parts of acrylamide, 0.75 part of sodium lauryl sulfate and 348 parts of deionized water over this same two hour period. The remainder of the catalyst solution is then added to the reaction vessel and the mixture is heated at 90° C. for an additional one hour period. The reaction mixture thus prepared was analyzed and revealed a polymer solids of 37.6%.

The cationic water dispersible nongelled polymeric materials used in the composition of the present invention may be any one of a plurality of polymeric materials which have reactive sites that are heat reactive with the melamine compounds used in the composition of the present invention. As in the anionic materials, these reactive sites may be either carboxyl groups and/or alcoholic hydroxyl groups and/or amide groups, which polymeric materials may be the result of vinyl polymerization. Therefore, all of the polymerizable monomers in each of these three principal classes may be used to prepare the cationic polymeric materials used in the present invention. Still further, these polymerizable monomers may be used with other polymerizable monomers such as the esters, styrenes, nitriles, and the like, all of which have been set forth hereinabove in significant detail in the discussion of the constitution of the anionic polymeric materials. The melamine compounds used in the composition of the present invention exhibit good migration characteristics with a wide variety of cationic polymeric materials. These cationic polymeric materials can be broadly described as being selected from any one of the following classes: acrylic polymers, of which a substantial variety are vinyl and acrylic monomers and can be copolymerized with amino acrylates and methacrylates such as dimethylaminoethyl methacrylate, diethylaminoethyl acrylate, and diethylaminoethyl acrylate, and the like. These polymers can be dissolved or dispersed in water with the addition of a water dispersible acid such as hydrochloric acid, acetic acid, and the like. It must be kept in mind that these polymers should also contain some —OH and/or —COOH and/or

groups which can be obtained by copolymerizing vinyl monomers with comparatively small amounts of such polymerizable monomers as hydroxyethyl methacrylate and/or acrylic acid or acrylamide. In this same broad classification, the amino methacrylates may be replaced by methylvinyl pyridine, and the like. Polymers containing this type of amine monomer can also be water dispersed by the addition of such water dispersible acids such as hydrochloric and acetic acids. The formation of the quaternary amine salt results in the water solubility or water dispersibility.

Another illustrative class of water dispersible non-gelled polymeric materials carrying a cationic charge and which material is heat reactive with the melamine compounds are the reaction products of polyfunctional epoxy compounds such as the reaction product of isopropylidine-4,4'-bisphenol with epichlorohydrin and then reacting with a polyfunctional amine such as diethylenetriamine, ethylene diamine, iminobispropylamine and the like to yield cationic polymers which can be water dispersed or dissolved upon addition of various water dispersible acids such as hydrochloric or acetic acids. The adjustment of the charged mole ratio of amine to epoxy compound will control the amount of hydroxy groups that will be available for cross-linking with the melamine compounds.

Another class of water dispersible nongelled polymeric material carrying cationic charges which are heat reactive with the melamine compounds used in the present invention are those prepared by reacting dibasic or tribasic organic acids with polyfunctional amines and with polyols which result in cationic polymers if sufficient polyfunctional amine is used in the initial charge. These polymers will be water soluble or dispersible with the addition of the aforementioned water dispersible acids and the formation of quaternary salts. These cationic polymers will also contain some free hydroxyl and/or carboxyl groups depending on the initial charge. A plurality of such water dispersible acidified polymers are prepared by the condensation of dimer acids with polyfunctional amines wherein the dimer acids are prepared by dimerizing a long chain fatty acid containing ethylenic unsaturation thereby providing a substance which results in the formation of a bridged long chain fatty dicarboxylic acid.

Another class of water dispersible non-gelled polymeric materials which carry a cationic charge and which are heat reactive with the melamine compounds used in the present invention are the cationic urea formaldehyde resins. These condensation products are prepared by reacting urea and formaldehyde with polyfunctional amines to produce cationic resins which are water dispersible upon the addition of a water dispersible acid such as hydrochloric acid or acetic acid. These polymers are cationic and will move to the cathode in an electric field. Still further, these cationic polymers will have free methylol groups available for said reactive cross-linking with the melamine compounds used in the composition of the present invention.

A further category of water dispersible nongelled polymeric materials which carry a cationic charge and which materials are heat reactive with the melamine compounds of the present invention are the polyethyleneimines. These polymeric materials are classical cationic polymers when treated with water dispersible acids in an aqueous system. This category of cationic polymers can be provided with reactive alcoholic hydroxyl groups simply by reacting the polyethyleneimine with controlled amounts of ethylene oxide. This modified cationic polymer will then move in the electric field and can be heat reacted with the melamine compound during the curing reaction.

The following example illustrates a process for preparing a water soluble cationic epoxy amine resin.

WATER SOLUBLE CATIONIC EPOXY AMINE RESIN

A mixture of 400 parts of a resinous reaction product prepared by reacting 4,4-dihydroxydiphenyldimethylmethane with epichlorohydrin having an epoxide average equivalency of 487 and 156 parts of tetraethylene pentamine are introduced into 400 parts of toluene at room temperature and then heated to reflux. After refluxing for one hour, the toluene and the unreacted tetraethylene pentamine are removed by distillation under reduced pressure finishing at about 175° C. and 3.5 mm./mercury pressure. An aqueous solution containing 30% of this resin is obtained by neutralizing the resin with an equivalent amount of dilute acetic acid and has a viscosity of 0.5 poise (Gardner-Holdt) of 25° C.

In the water dispersible non-gelled polymeric material carrying either a cationic or anionic charge, the amount of carboxyl groups and/or alcoholic hydroxyl groups and/or amide groups should be at least about 3%, by weight, based on the total weight of the polymeric material and not greater than about 30%, by weight, based on the total weight of the polymeric material. Preferably, one would use between about 5% to about 20%, by weight, based on the total weight of the polymeric material of the carboxyl-containing monomer and/or the alcoholic hydroxyl-containing monomer or the amide-containing monomer. These percentages, by weight, prevail whether the individual monomer-containing carboxyl groups, alcoholic hydroxyl-groups or amide groups are the sole reactive groups present and whether they are present in any of the above combinations.

As before, these examples are set both primarily for purpose of illustration and any specific enumeration of detail contained therein should not be interpreted as a limitation on the case except as is indicated in the appended claims. All parts are parts, by weight, unless otherwise indicated.

Example 1

A clear cloating vehicle is prepared from 75 parts of a commercially available water soluble maleinised oil and 25 parts of an ethylated, methylated hexamethylol melamine having the following mole ratio:

M/F/Me/Et=1/5.8/2.1/3.6

The maleinised oil having first been dispersed in water was adjusted by an addition of ammonia to a pH of 8 whereupon the ethylated, methylated hexamethylol melamine was added and the pH again adjusted to about 8 with ammonia. The coating solution is diluted to about 10% solids with water and the temperature is held at about 25° C. Steel panels were immersed in the solution and electrocoated at a 50 v. potential for three minutes. Analysis of the electrodeposited films showed that this composition was 75/25 maleinised oil to melamine compound solids, respectively, indicating a 100% migration of this melamine compound to the anode.

Comparative Example 2

Example 1 is repeated in all essential details except that in the place of the methylated, ethylated hexamethylol melamine there is used exclusively hexamethyl ether of hexamethylol melamine. The analysis of the electrodeposited films showed that the composition of this comparative example was 93/7 maleinised oil to the hexakismethoxymethyl melamine solids, respectively. This indicates that only 28% of the hexamethyl ether of hexamethylol melamine that was present in the bath migrated to the anode. It should also be noticed that the hexamethyl ether of hexamethylol melamine is not encompassed in the present invention but rather is excluded.

Example 3

A pigmented enamel is prepared from the maleinised oil described in Example 1 and the methylated, ethylated hexamethylol melamine of Example 1 but using a solids ratio of 85/15, respectively. The pigment to binder ratio was adjusted to 30/100 using a commercially available titanium dioxide. The coating bath solids were adjusted to 10% and the pH to 8.5 and the temperature controlled at 23° C. Steel panels were electrocoated at 35 v. for three minutes. Analysis of the pigmented film showed a ratio of the maleinised oil to the melamine compound solids was 85/15, indicating a 100% migration of the melamine compound to the anode.

Comparative Example 4

65 parts of the carboxyl containing copolymer prepared hereinabove, on a solids basis, is blended with 35 parts of hexakismethoxymethyl melamine. The total solids in the dispersion is adjusted to about 10% with water dilution and the pH is adjusted to about 7.5. The temperature is controlled at 25° C. Steel panels were electrocoated at 50 v. for three minutes and an analysis of the deposited film showed a composition of 87/13 acrylic resin to hexakismethoxymethyl solids, respectively. This indicates that a 37% migration of the melamine compound took place.

Example 5

Comparative Example 4 is repeated in all essential details except that in the place of hexakismethoxymethyl melamine there was used a melamine/formaldehyde/methanol/propanol mixed ether having a molar ratio of M/F/Me/Pr of 1/5.9/3.0/2.5. The pH was adjusted to 7.9 with ammonia and a film was electrocoated as in comparative Example 4. Analysis of this coating showed that it had a composition of 66/34 acrylic to amino solids, respectively. This represented a 97% migration of the melamine compound to the anode.

Example 6

An emulsion tetrapolymer having a composition of styrene, ethyl acrylate, acrylic acid and hydroxy ethyl methacrylate monomers at a weight ratio of 170/235.6/4.5/32, respectively, was prepared at 48% solids. This emulsion was blended with a melamine compound having a composition of M/F/Me/Pr of 1/5.9/2.0/3.5 in a weight ratio of 88/12 emulsion solids to the etherified melamine compound, respectively. The emulsified blend was adjusted to 10% solids and the pH adjusted to 9.2 with dimethyl aminoethanol. The temperature was controlled at 25° C. Steel panels were electrocoated at 25 v. for two minutes. The composition of the electrodeposited film was 93/7 acrylic emulsion solids to melamine compound, respectively, which represents a 58% migration of the melamine compound to the anode.

Comparative Example 7

Example 6 is repeated in all essential details except that in the place of the mixed ether of hexamethylol melamine there was used an equal amount of the hexamethyl ether of hexamethylol melamine. The film deposited on the sheets of steel was analyzed and found to have a composition of 99/1 acrylic emulsion to melamine compound solids, respectively, which indicated that only 8.3% of the melamine compound had migrated to the electrode.

Example 8

An acrylic emulsion having a composition of styrene, ethyl acrylate, acrylic acid and acrylamide is prepared having a weight ratio of monomers as follows: 212/293/5.3/21, respectively. This emulsified tetrapolymer was blended with an amino compound having a composition of M/F/Me/Bu of 1/5.8/3.0/2.5. The solids ratio of the acrylic emulsion to the melamine compound was 85/15, respectively. The vehicle was diluted to 10% solids content with water and the pH adjusted to 8.0. The temperature was controlled at 35° C. Aluminum panels were electrocoated at 35 v. for three minutes. The composition of the deposited film was 90.5/9.5 acrylic emulsion solids to melamine compound solids, respectively. This represented a 63% melamine compound migration to the anode.

Example 9

A water dispersible alkyd resin is prepared from stearic acid, trimellitic anhydride, phthalic anhydride, and a styrene-allyl alcohol copolymer. The aqueous dispersion was blended with a mixed ether having the following composition: M/F/Me/Et of 1/5.8/2.0/3.5. The blend contained an 85/15 solids ratio of water dispersible alkyd to melamine compound, respectively. The dispersion is then diluted to 10% solids with water and the pH adjusted to 7.5 with diethanolamine. The temperature is controlled at 23° C. The coating is electrodeposited on steel panels at 200 v. for one minute. Analysis of the deposited film showed that the composition was 85/15 alkyd solids to melamine compound indicating a 100% melamine compound migration to the anode.

Example 10

A blend of 75 parts of maleinised oil and a substantially fully ethylated hexamethylol melamine compound are dispersed in water in a ratio of 75/25 parts of solids, respectively, and the M/F/Et mole ratio is 1/5.8/5.5, respectively. The pH is adjusted to 8.3 and the dispersion is held at 25° C. The dispersion is reduced to 10% solids and the coating is electrodeposited on steel panels at 50 v. for two minutes. Analysis of the deposited film showed that the composition was 75/25 maleinised oils to melamine compound, indicating a 100% melamine compound migration to the anode.

Example 11

A blend of 85 parts of the water soluble cationic epoxy amine resin prepared according to the process set forth in the example hereinabove and 15 parts of a substantially fully ethylated hexamethylol melamine compound are dispersed in water in which the M/F/Et mole ratio is 1/5.8/5.5, respectively. The pH is adjusted to about 5.5 and the dispersion is held at 25° C. The dispersion is reduced to about 10% solids and a coating is electrodeposited on steel panels at 50 v. for 2 minutes. Analysis of the deposited film showed about 85/15 epoxy amine resin to melamine compound, indicating a 100% melamine compound migration to the cathode.

In the above electrodeposition studies, the coating bath was prepared at about 10% solids (ionic polymeric material plus melamine compound) for both clear and pigmented formulations at the pH's and temperatures stated. The films were deposited on steel or aluminum panels using a Ransburg electrocoating apparatus. The potential difference in voltage and times of exposure are stated. In each instance, the panels were washed under a stream of water and baked at about 300° F. for about 30 minutes. The composition of the electrodeposited films was determined by the use of attenuated total reflectance (ATR) infrared spectroscopy. ATR spectroscopy were run on 2 x 3 cm. pieces of the coated panel and calibration curves were prepared by plotting the reflective loss ratio of the triazine band at 815 cm.$^{-1}$ to the carboxyl band 1740 cm.$^{-1}$ against the melamine compound concentration. A Beckman IR–4 spectrophotometer with an ATR attachment having a KRS–5 prism (Connecticut Instrument Company, Wilton, Conn.), was used for these measurements. Calibration curves were determined for both clear and pigmented formulations. The reflective loss of the electrodeposited films was measured and the percent migration of the melamine compounds is determined from the respective calibration curve.

When the compositions of the present invention are used to deposit electrically the coatings of the present invention on electroconductive metallic articles, the compositions may be diluted with water to concentrations varying between about 3% and 30% and, preferably, between about 7% and 15% total resins solids.

I claim:

1. In a process for electrocoating films on metal, the improvement comprising immersing said metal in an aqueous dispersion of a mixture of from about 5% to about 40%, by weight, of (A) a mixture of substantially water-insoluble, substantially fully etherified hexamethylol melamines which have no more than four methoxymethyl groups on the average and at least two alkoxymethyl groups selected from the group consisting of ethoxymethyl, propoxymethyl and butoxymethyl on the average and correspondingly from about 95% to about 60%, by weight, of (B) a water dispersible nongelled polymeric material carrying an ionic charge which polymeric material contains at least one class of reactive groups selected from the group consisting of carboxyl groups, alcoholic hydroxy groups and amide groups wherein the amount of said groups is at least about 3%, by weight, and not more than about 30%, by weight, based on the total weight of said polymeric material; wherein said groups are heat reactive with (A) and wherein said percentages of (A) and (B), by weight, total 100% and are based on the total solids weight of (A) and (B) and subjecting the aqueous dispersion to electrophoresis in order to deposit the mixture of (A) and (B) on the metal as an adherent film.

2. A process according to claim 1 in which the aqueous dispersion is alkaline and in which the water dispersible nongelled polymeric material carries an anionic charge.

3. A process according to claim 2 in which the said fully etherified hexamethylol melamine have no more than three methoxymethyl groups on the average and have at least three alkoxymethyl groups selected from the group consisting of ethoxymethyl, propoxymethyl and butoxymethyl on the average.

4. A process according to claim 2 in which said anionic polymeric material contains carboxyl groups.

5. A process according to claim 2 in which said anionic polymeric material contains hydroxyl groups.

6. A process according to claim 2 in which said anionic polymeric material contains amide groups.

7. A process according to claim 3 in which said anionic polymeric material contains carboxyl groups.

8. A process according to claim 3 in which said anionic polymeric material contains hydroxyl groups.

9. A process according to claim 3 in which said anionic polymeric material contains amide groups.

10. A process according to claim 2 in which said alkoxymethyl groups are ethoxymethyl.

11. A process according to claim 3 wherein said alkoxymethyl groups are ethoxymethyl.

References Cited

UNITED STATES PATENTS

| | | | |
|---|---|---|---|
| 2,994,676 | 8/1961 | Kucsan et al. | 260—29.4 |
| 3,025,251 | 3/1962 | Layman | 260—67.6 |
| 3,102,868 | 9/1963 | Bolton et al. | 260—29.4 |
| 3,107,227 | 9/1963 | Suen et al. | 260—29.4 |
| 3,362,899 | 1/1968 | Gilchrist | 204—181 |
| 2,998,410 | 8/1961 | Jefts et al. | 260—67.6 |
| 3,132,965 | 5/1964 | Schmidt et al. | 260—29.4 |
| 3,211,579 | 10/1965 | Reiter | 260—67.6 |
| 3,349,054 | 10/1967 | Leitner et al. | 260—29.6 |
| 3,352,806 | 11/1967 | Hicks | 260—29.4 |
| 3,378,477 | 4/1968 | Gentles et al. | 260—29.4 |

MURRAY TILLMAN, Primary Examiner

JOHN T. GOOLKASIAN, Assistant Examiner

U.S. Cl. X.R.

260—29.4, 850, 851, 854, 855, 856

Dedication

3,471,388. —*Jerry Norman Koral*, Stamford, Conn. ELECTRODEPOSITION OF AQUEOUS COATINGS CONTAINING ETHERIFIED METHYLOLATED MELAMINE. Patent dated Oct. 7, 1969. Dedication filed Mar. 4, 1983, by the assignee, *American Cyanamid Co.*

Hereby dedicates the remaining term of said patent to the Public.

[*Official Gazette May 31, 1983.*]